(12) United States Patent
Namari et al.

(10) Patent No.: US 7,360,407 B2
(45) Date of Patent: Apr. 22, 2008

(54) CRANK ANGLE DETECTING APPARATUS AND REFERENCE ANGULAR POSITION DETECTION METHOD FOR INTERNAL COMBUSTION ENGINE

(75) Inventors: Takashi Namari, Tochigi (JP);
Kazuhito Tokugawa, Tochigi (JP);
Satoshi Chida, Tochigi (JP)

(73) Assignee: Keihin Corporation, Tokyo (JP)

( * ) Notice: Subject to any disclaimer, the term of this patent is extended or adjusted under 35 U.S.C. 154(b) by 100 days.

(21) Appl. No.: 11/497,518

(22) Filed: Aug. 2, 2006

(65) Prior Publication Data
US 2007/0033995 A1 Feb. 15, 2007

(30) Foreign Application Priority Data
Aug. 5, 2005 (JP) .............................. 2005-227834

(51) Int. Cl.
*G01M 15/00* (2006.01)
(52) U.S. Cl. .................................... 73/117.3
(58) Field of Classification Search ................. 73/116, 73/117.2, 117.3, 118.1
See application file for complete search history.

(56) References Cited
U.S. PATENT DOCUMENTS
5,325,710 A * 7/1994 Morikawa .................... 73/116

5,442,955 A * 8/1995 Baba et al. ................. 73/117.3
2005/0212508 A1* 9/2005 Damitz et al. ........... 324/207.2
2006/0070430 A1* 4/2006 Baumann et al. ......... 73/119 R FOREIGN PATENT DOCUMENTS
JP 59-31406 A 2/1984
JP 59-173562 A 10/1984
JP 6-17735 A 1/1994

* cited by examiner

*Primary Examiner*—Eric S. McCall
(74) *Attorney, Agent, or Firm*—Westerman, Hattori, Daniels & Adrian, LLP.

(57) ABSTRACT

A rotor is provided such that the rotor rotates with a crank shaft of an engine. A plurality of detection sections are formed on a rotor periphery at equal angle intervals. A particular detection section is used for detection of a reference crank angle. A pickup is provided near the rotor periphery. A crank angle detecting apparatus receives pulse signals from the pickup, and sequentially detects a detection section time. The detection section time is a time interval from the front end to the rear end of the detection section. The crank angle detecting apparatus also sequentially detects a time between each two adjacent detection sections (detection section distance time), which is a time from the rear end of one detection section to the front end of the next detection section. A reference angle detection signal, which indicates detection of the detection section dedicated for the reference angle, is generated when at least two ratio conditions are met. These ratio conditions are decided based on the detection section time and the detection section distance time.

16 Claims, 6 Drawing Sheets

TCSTG1=TCSTG2=TCSTG3= ···· =TCSTG24=15°

CRANK ANGLE DETECTING APPARATUS AND REFERENCE ANGULAR POSITION DETECTION METHOD FOR INTERNAL COMBUSTION ENGINE

BACKGROUND OF THE INVENTION

1. Field of the Invention

The present invention relates to a crank angle detecting apparatus and a reference angular position detection method for determining that the crank shaft of an internal combustion engine reaches a reference angular position.

2. Description of the Related Art

When controlling the timing of fuel injection for feeding fuel to an internal combustion engine by using an injector, or when controlling the ignition timing for causing the spark plug to perform spark discharge, a rotation angular position (i.e., crank angle) of the crank shaft of the engine is detected (determined) based on the reference angular position, and then these timings are set.

A typical crank angle detecting apparatus for detecting a rotational angle of the crank shaft of the engine includes a disc-shaped rotor, which rotates with the crank shaft, and an electromagnetic pickup, which is disposed in the vicinity of the outer periphery of the rotor. A plurality of convex sections or concave sections as detection sections are provided on the outer periphery of the rotor. The convex or concave sections are made of a magnetic material, and spaced from each other at a predetermined angle. When the rotor rotates with the crank shaft, a pulse is generated from the electromagnetic pickup upon passing of the detection section in the vicinity of the electromagnetic pickup. A certain detection section is omitted at a location which corresponds to the reference angle of the crank shaft so that a special pulse is generated at the reference crank angle while the rotor rotates 360 degrees. Alternatively, a longer detection section is provided at a location which corresponds to the reference angle of the crank shaft so that a special pulse is generated. The special pulse has a different shape than other ordinary pulses. For example, the special pulse includes a relatively long no-peak period. A time point at which the crank shaft is on the reference angular position is detected, and pulses are counted on the basis of this detected time point. Then, the fuel injection timing and the ignition timing are set. Such apparatuses are disclosed in, for example, Japanese Patent Application Laid-Open (Kokai) No. S59-31406, Japanese Patent Application Laid-Open No. S59-173562, and Japanese Patent Application Laid-Open No. H6-17735.

In order to improve the accuracy of the timing setting, it is required to increase the number of detection sections on the rotor. In order to detect a time point for every fifteen degrees of the crank angle, for example, twenty four detection sections are required to be disposed at regular intervals on the outer periphery of the rotor. If the number of detection sections increases, the distance between each two detection sections becomes narrower. When the longer detection section which is elongated in the direction of rotation of the rotor should be provided on the rotor to detect the reference angular position, it is difficult in reality to form a sufficiently long detection section on the rotor surface. As a result, the accuracy of detection of the elongated detection section drops.

SUMMARY OF THE INVENTION

One object of the present invention is to provide a crank angle detecting apparatus which can detect, with a high degree of accuracy, that the crank shaft reaches the reference angular position even when the number of detection sections on the rotor is increased.

Another object of the present invention is to provide a reference angular position detection method which can detect, with a high degree of accuracy, that the crank shaft reaches the reference angular position even when the number of detection sections on the rotor is large.

According to a first aspect of the present invention, there is provided a crank angle detecting apparatus that includes a rotor which rotates in conjunction with a crank shaft of an internal combustion engine. The rotor has a plurality of detection sections provided at equiangular intervals on the outer periphery thereof. One of the detection sections is used in detection of a reference crank angle, and is longer than other detection sections in a circumferential direction of the rotor. The crank angle detecting apparatus also includes a pickup disposed in the vicinity of the outer periphery of the rotor for generating a pulse signal every time the pickup detects a front end of each detection section and for generating another pulse signal every time the pickup detects a rear end of each detection section. The crank angle detecting apparatus also includes a time detector for sequentially detecting, in response to the pulse signals generated from the pickup, a detection section time, which is a time interval between detection of the front end of one detection section and detection of the rear end of the same detection section. The detection section time represents the length of the detection section. The time detector also detects a detection section distance time, which is a time interval between detection of the rear end of one detection section and detection of the front end of a next detection section. The detection section distance time represents the distance between the detection sections. The crank angle detecting apparatus also includes a reference angle determination circuit for generating a reference angle detection signal which indicates detection of the detection section used in detection of the reference angle, when at least two ratio conditions obtained from the detection section time and the detection section distance time which are obtained from the time detection circuit are satisfied.

According to a second aspect of the present invention, there is provided another crank angle detecting apparatus. This crank angle detecting apparatus includes a rotor which rotates in conjunction with a crank shaft of an internal combustion engine. The rotor has a plurality of detection sections provided on the outer periphery of the rotor. An angular distance between front ends of each two adjacent detection sections is the same for all the detection sections, or an angular distance between rear ends of each two adjacent detection sections is the same for all the detection sections. One of the detection sections is used in detection of a reference crank angle, and is longer than other detection sections in the circumferential direction of the rotor. The crank angle detecting apparatus also includes a pickup disposed in the vicinity of the outer periphery of the rotor for generating a pulse signal every time when detecting a front end and a rear end of each detection section separately. The crank angle detecting apparatus also includes a time detection circuit for sequentially detecting, in response to the pulse signals from the pickup, a first time interval between the rear ends of each two adjacent detection sections if the angular distance between the front ends of each two adjacent detection sections is the same for all the detection sections, or a second time interval between the front ends of each two adjacent detection sections if the angular distance between the rear ends of the detection sections is the same for all the detection sections. The crank angle detecting apparatus also includes a reference angle determination circuit for generating a reference angle detection signal which indicates detection of the detection section used in detection of the reference angle, when a ratio condition obtained from the first or second time interval which is detected by the time detection circuit is satisfied.

According to a third aspect of the present invention, there is provided another crank angle detecting apparatus. This crank angle detecting apparatus includes a rotor which rotates in conjunction with a crank shaft of an internal combustion engine. The rotor has a plurality of detection sections provided on the outer periphery thereof. An angular distance between front ends of each two adjacent detection sections is the same for all the detection sections, or an angular distance between rear ends of each two adjacent detection sections is the same for all the detection sections. One of the detection sections is used in detection of a reference crank angle, and is longer than other detection sections in a circumferential direction of the rotor. The crank angle detecting apparatus also includes a pickup disposed in the vicinity of the outer periphery of the rotor for generating a pulse signal every time when detecting a front end and a rear end of each detection section separately. The crank angle detecting apparatus also includes a first time detection circuit for sequentially detecting, in response to the pulse signals from the pickup, a detection section time between detection of the front end and rear end of each detection section, and a detection section distance time between detection of the rear end of one detection section and detection of the front end of a next detection section. The crank angle detecting apparatus includes a second time detection circuit for sequentially detecting, in response to the pulse signals from the pickup, a first time interval between the rear ends of each two adjacent detection sections if the angular distance between the front ends of the detection sections is the same for all the detection sections, or a second time interval between the front ends of each two adjacent detection sections if the angular distance between the rear ends of the detection sections is the same for all the detection sections. The crank angle detecting apparatus includes a reference angle determination circuit for generating a reference angle detection signal which indicates detection of the detection section used in detection of a reference angle, when at least two ratio conditions obtained from the detection section time and the detection section distance time which are detected by the first time detection circuit are satisfied, or when another ratio condition obtained from the first or second time interval which is detected by the second time detection circuit is satisfied.

According to a fourth aspect of the present invention, there is provided a reference angular position detection method for a crank shaft of an internal combustion engine. This detection method is used in a crank angle detecting apparatus. The crank angle detecting apparatus includes a rotor which rotates in conjunction with the crank shaft of the internal combustion engine and has a plurality of detection sections provided at equiangular intervals on the outer periphery thereof. One of the detection sections is used in detection of a reference crank angle and is longer than other detection sections in a circumferential direction of the rotor. The crank angle detecting apparatus also includes a pickup disposed in the vicinity of the outer periphery of the rotor for generating a pulse signal every time when detecting a front end and a rear end of each detection section separately. The reference angular position detection method includes the step of sequentially detecting, in response to the pulse signals from the pickup, a detection section time, which is a time interval between detection of the front end of each detection section and detection of the rear end of the same detection section, and a detection section distance time, which is a time interval between detection of the rear end of one detection section and detection of the front end of a next detection section. The reference angular position detection method also includes the step of generating a reference angle detection signal which indicates detection of the detection section used in detection of the reference crank angle, when at least two ratio conditions obtained from the detection section time and the detection section distance time are satisfied.

According to a fifth aspect of the present invention, there is provided another reference angular position detection method for a crank shaft of an internal combustion engine. This detection method is used in a crank angle detecting apparatus. The crank angle detecting apparatus includes a rotor which rotates in conjunction with the crank shaft and has a plurality of detection sections. The detection sections are provided on the outer periphery of the rotor. An angular distance between front ends of each two adjacent detection sections is the same for all the detection sections, or an angular distance between rear ends of each two adjacent detection sections is the same for all the detection sections. One of the detection sections is used in detection of a reference crank angle, and is longer than other detection sections in a circumferential direction of the rotor. The crank angle detecting apparatus includes a pickup disposed in the vicinity of the outer periphery of the rotor for generating a pulse signal every time when detecting a front end and a rear end of each detection section separately. The reference angular position detection method includes the step of sequentially detecting, in response to the pulse signals from the pickup, a first time interval between the rear ends of each two adjacent detection sections if the angular distance between the front ends of each two adjacent detection sections is the same for all the detection sections, or a second time interval between the front ends of each two adjacent detection sections if the angular distance between the rear ends of each two adjacent detection sections is the same for all the detection sections. The reference angular position detection method also includes the step of generating a reference angle detection signal which indicates detection of the detection section dedicated for the reference angle detection, when a ratio condition obtained from the first or second time interval is satisfied.

According to a sixth aspect of the present invention, there is provided another reference angular position detection method for a crank shaft of an internal combustion engine. This detection method is used in a crank angle detecting apparatus. The crank angle detecting apparatus includes a rotor which rotates in conjunction with the crank shaft and has a plurality of detection sections. The detection sections are provided on the outer periphery of the rotor. An angular distance between front ends of each two adjacent detection sections is the same for all the detection sections, or an angular distance between rear ends of each two adjacent detection sections is the same for all the detection sections. One of the detection sections is used in detection of a reference crank angle, and is longer than other detection sections in a circumferential direction of the rotor. The crank angle detecting apparatus also includes a pickup disposed in the vicinity of the outer periphery of the rotor for generating a pulse signal every time when detecting a front end and a rear end of each detection section separately. The reference angular position detection method includes the step of sequentially detecting, in response to the pulse signals from the pickup, a detection section time between detection of the front end of one detection section and detection of the rear end of the same detection section, and a detection section distance time between detection of the rear end of one detection section and detection of the front end of a next detection section. The reference angular position detection method also includes the step of sequentially detecting, in response to the pulse signals from the pickup, a first time interval between the rear ends of each two adjacent detection sections if the angular distance between the front ends of each two adjacent detection sections is the same for all the detection sections, or a second time interval between the front ends of each two adjacent detection sections if the angular distance between the rear ends of each two adjacent detection sections is the same for all the detection sections. The reference angular position detection method also includes the step of generating a reference angle detection signal which indicates detection of the detection section dedicated for detection of the reference angle, when at least two ratio conditions based on the detection section time and the detection section distance time are satisfied, or when another ratio condition based on the first or second time interval is satisfied.

These and other objects, aspects and advantages of the present invention will become apparent to those skilled in the art from the following detailed description and the appended claims when read and understood in conjunction with the accompanying drawings.

DETAILED DESCRIPTION OF THE PRESENT INVENTION

An embodiment of the present invention will be described in detail hereinafter with reference to the drawings.

Figure 1:
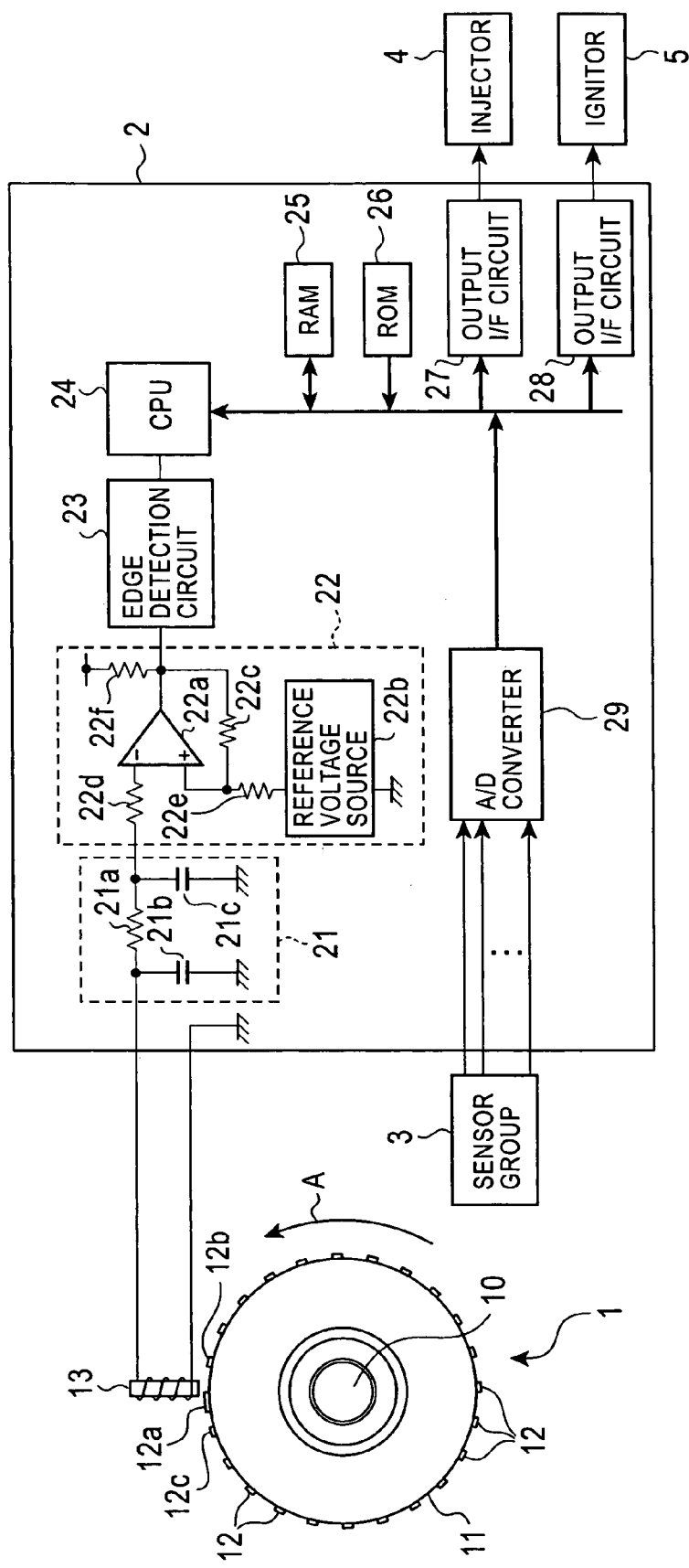
FIG. 1 is a block diagram showing an embodiment of the present invention which includes a crank angle detecting apparatus.

Referring to FIG. 1, an engine control apparatus to which the crank angle detecting apparatus of the present embodiment is applied will be described. This engine control apparatus includes the crank angle detecting apparatus 1, an ECU (Electric Control Unit) 2, a sensor group 3, an injector 4, and an ignition device 5.

The crank angle detecting apparatus 1 has a disc-shaped rotor 11 provided on a crank shaft 10 of a four-cycle internal combustion engine. The rotor 11 rotates in conjunction with a rotation of the crank shaft 10. The outer peripheral surface of the rotor 11 is provided with twenty-four convex sections 12 at fifteen-degree interval. These convex sections 12 are made of a magnetic material, and serve as detection sections. An electromagnetic pickup 13 is disposed in the vicinity of the outer periphery of the rotor 11. When the rotor 11 rotates, a pair of positive and negative pulses are generated from the electromagnetic pickup 13 when the convex section 12 passes the vicinity of the electromagnetic pickup 13. These positive and negative pulses are crank angle pulse signals. The rotor 11 rotates in the direction of the arrow A in FIG. 1.

The fifteen-degree interval between each two convex sections 12 is measured from the rear end of one detection section 12 to the rear end of a next detection section 12 in the rotation direction (or circumferential direction) of the rotor 11. One of the twenty-four convex sections 12, which is a convex section 12a, is a convex section indicating a reference crank angle. The reference angle is the crank angle at the rear end of the convex section 12a in the rotation direction of the rotor 11, which is a position of −7 degrees from the TDC (top dead center) of a piston in the 360 degrees of the rotor 11. The convex section 12a is longer than other convex sections 12 in the rotation direction of the rotor 11. In other words, the length between the rear end and the front end of the elongated convex section 12a is larger than the length of other convex section. Thus, the timing for detecting the front end of the convex section 12a performed by the electromagnetic pickup 13 is earlier than the timing for detecting the front end of other convex sections 12. The length between the front end and the rear end of the convex section 12a is, for example, twice the distance between the front end of the convex section 12a and the rear end of a neighboring convex section 12c. The length between the front end and the rear end of the convex section 12a is, for example, twice the length between the front end and the rear end of other convex sections 12.

When the rotor 11 rotates in the rotation direction A, the rear end of the convex section 12b, which is detected after the convex section 12a, is positioned within a range of 0 through 10 degrees from the TDC. In this embodiment, it is positioned at eight degrees from the TDC. A crank angle pulse signal obtained from the elongated convex section 12a is a reference pulse signal.

The ECU 2 is connected to the output of the electromagnetic pickup 13. The ECU 2 has a filter circuit 21, a comparison circuit 22, an edge detection circuit 23, a CPU 24, a RAM 25, a ROM 26, output interface circuits 27, 28, and an A/D converter 29.

The filter circuit 21 has a resistance 21a and capacitors 21b, 21c. The filter circuit 21 eliminates a high-frequency noise components in the pulse signals generated from the electromagnetic pickup 13, and produces a pair of positive and negative pulses.

The comparison circuit 22 has a comparator 22a, a reference voltage source 22b, and resistances 22c through 22f. The comparison circuit 22 has a hysteresis function. The comparison circuit 22 generates a low-level output signal when an output signal from the filter circuit 21 becomes a predetermined voltage Vth or higher, and generates a high-level output signal when the output signal from the filter circuit 21 is a predetermined voltage −Vth or less. The high-level output period corresponds to the period of the convex sections 12 including the convex section 12a of the rotor 11, and the low-level output period corresponds to a period between the convex sections 12 (i.e., a period of the flat sections of the rotor 11). An output signal from the comparison circuit 22 is supplied as a crank angle signal to the CPU 24.

The edge detection circuit 23 detects a rising edge and falling edge of the signal output from the comparison circuit 22.

The CPU 24 counts the low-level period and high-level period separately in response to the edge detection performed by the edge detection circuit 23, and finds the elongated convex section 12a indicating the reference crank angle on the basis of a result of the counting. The CPU 24 repeatedly executes a crank synchronous process, which will be described later, and detects a reference crank angle and a crank stage of the crank angle to perform control of the ignition timing and fuel injection based on the detection results. The CPU 24, RAM 25, ROM 26, output interface circuits 27, 28, and A/D converter 29 are connected to a bus.

The output interface circuit 27 drives the injector 4 in response to an injector drive command from the CPU 24. The injector 4 is provided in the vicinity of an intake port of an intake pipe of the internal combustion engine, and injects fuel. The output interface circuit 28 activates the ignitor 5 in response to an energization start command and an ignition start command from the CPU 24. Specifically, energization of an ignition coil (not shown) of the ignitor 5 is started in response to the energization start command, and the energization is stopped in response to the ignition start command, whereby an ignition plug (not shown) is caused to perform spark discharge. The ignitor 5 is, for example, a full-transistor ignitor, which supplies the electricity to the ignition coil, generates high voltage by means of accumulated charges of the ignition coil, and applies the high voltage to the ignition plug.

The A/D converter 29 converts an analog signal sent from the sensor group 3, which detects engine operating parameters such as the intake pipe pressure $P_B$, coolant temperature TW, throttle opening $\theta_{th}$, and oxygen concentration $O_2$ in the exhaust gas, to a digital signal. These engine operating parameters are used for the engine control.

Figure 2:
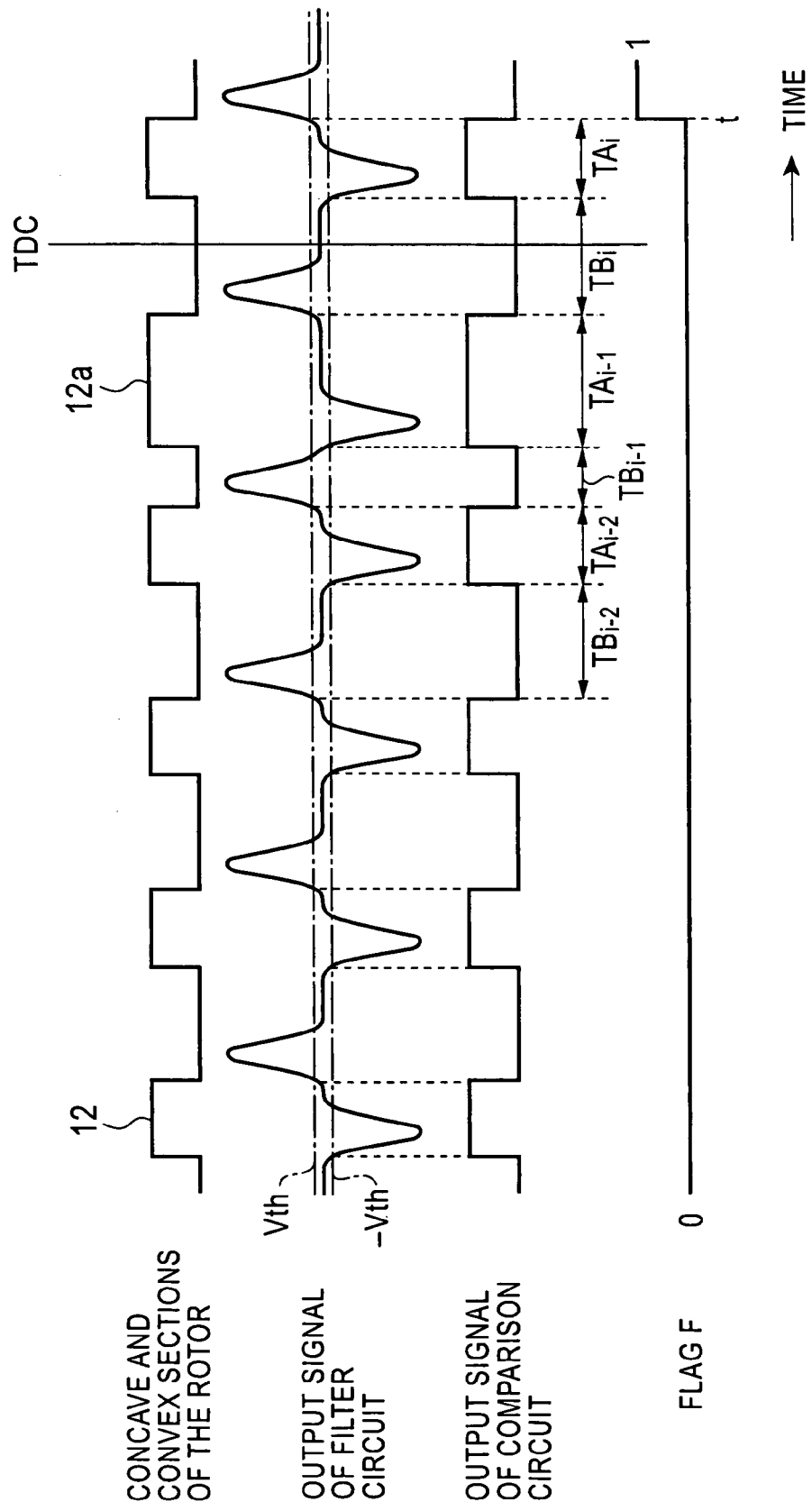
FIG. 2 shows the relationship between concave and convex sections of a rotor of the crank angle detecting apparatus of FIG. 1 and signal waveforms of these sections of the rotor.

In the engine control apparatus, an output signal from the electromagnetic pickup 13 passes through the filter circuit 21, and becomes a negative pulse in the form of an inverted triangle with respect to the front end of each convex section 12 (including 12a) of the rotor 11, and a positive pulse in the form of a triangle with respect to the rear end of each convex section 12, as shown in FIG. 2. In the comparison circuit 22, an output signal of the filter circuit 21 is compared with the predetermined voltage $-V_{th}$ when the output signal decreases, and is compared with the predetermined voltage $V_{th}$ when the output signal increases. Therefore, the crank angle signal supplied from the comparison circuit 22 to the edge detection circuit 23 becomes high level for the convex sections 12 of the rotor 11 and low level for the concave sections (flat sections) between the convex sections 12, as shown in FIG. 2.

The edge detection circuit 23 detects a rising edge and falling edge of the crank angle signal and supplies a signal indicating the time point of each detection to the CPU 24. The CPU 24 measures the time period between the rising edges and falling edges detected by the edge detection circuit 23. The rising edges correspond to the front ends of the convex sections 12 and the falling edges correspond to the rear ends of the convex sections 12. The time period corresponding to the convex section 12 of the rotor 11 from a rising edge to a falling edge is detected as a convex section time TA (detection section time). The time period corresponding to a concave section between the convex sections 12 of the rotor 11 from a falling edge of one convex section to a rising edge of a next convex section is detected as a convex section time TB (time between detection sections or detection section distance time).

Figure 3:
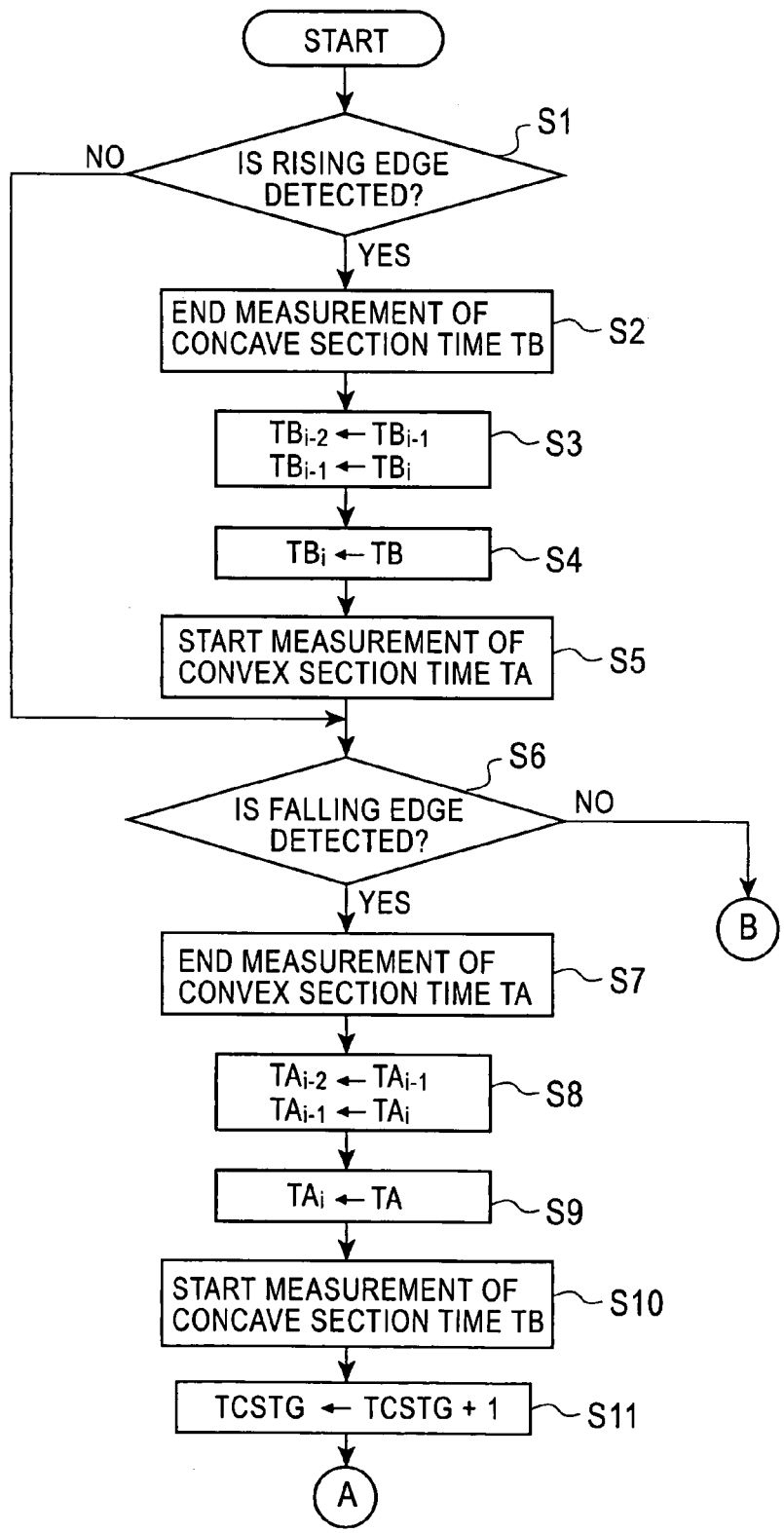
FIG. 3 and FIG. 4 show in combination a flowchart of a crank synchronous process.
Figure 4:
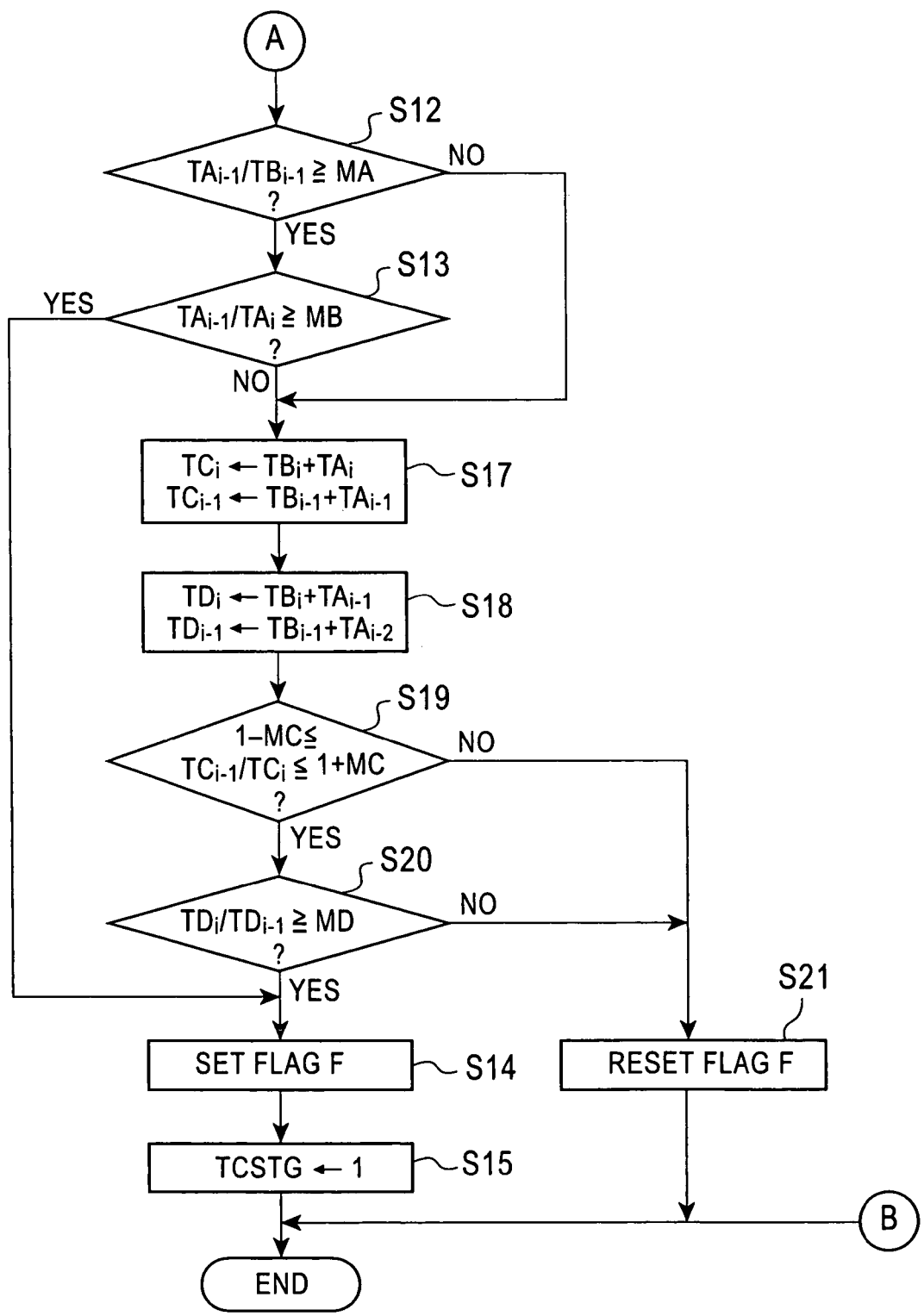

The CPU 24 performs the crank synchronous process, as shown in FIG. 3 and FIG. 4. The CPU 24 first determines whether a rising edge of an output signal from the comparison circuit 22 is detected or not, in response to an output signal from the edge detection circuit 23 (Step S1). When a rising edge is detected, measurement of the concave section time TB is ended (Step S2). Then, the previous concave section time TBi−1 is taken as the previous-before-previous concave section time TBi−2, and the current concave section time TBi is taken as the previous concave section time TBi−1 (Step S3). Subsequently, the newly obtained concave section time TB is taken as the current concave section time TBi (Step S4), and measurement of a convex section time TA is started (Step S5). It should be noted that i indicates the current value for each of the convex section time TA and concave section time TB, i−1 indicates the previous value and i−2 indicates the previous-before-previous value.

Figure 6:
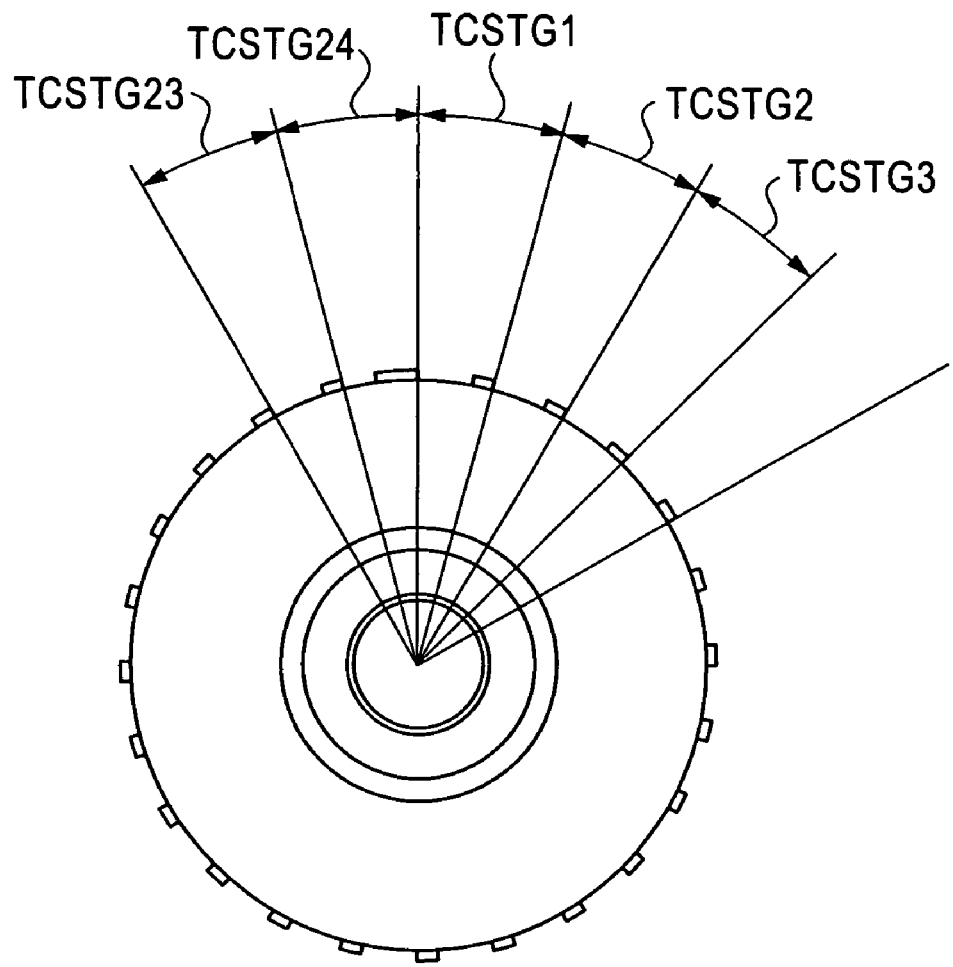
FIG. 6 shows twenty-four crank stages used in the apparatus shown in FIG. 1.

When a rising edge is not detected, it is determined whether a falling edge of the output signal of the comparison circuit 22 is detected (Step S6). When a falling edge is detected, the measurement of the convex section time TA is ended (Step S7). Then, the previous convex section time TAi−1 is taken as the previous-before-previous convex section time TAi−2, the current convex section time TAi is taken as the previous convex section time TAi−1 (Step S8), and the newly obtained convex section time TA is taken as the current convex section time TAi (Step S9). Subsequently, measurement of the concave section time TB is started (Step S10). The CPU 24 also increases the crank stage TCSTG by 1 (Step S11). The crank stage TCSTG indicates any one of stages 1 through 24 corresponding to the equiangular intervals defined by the convex sections 12, as shown in FIG. 6. Each crank stage TCSTG is 24-degree wide. As understood from FIG. 6, the angular distance between the rear ends of each two adjacent detection sections 12 is the same for all the detection sections 12 in this embodiment.

The CPU 24 computes the ratio TAi−1/TBi−1 from the previous convex section time TAi−1 and the previous concave section time TBi−1, and determines whether the ratio TAi−1/TBi−1 is at least a first predetermined value MA (for example, 2) (Step S12). TAi−1/TBi−1≧MA is a first ratio condition. If this first ratio condition is satisfied, the CPU 24 computes the ratio TAi−1/TAi between the previous convex section time TAi−1 and the current convex section time TAi, and determines whether the ratio TAi−1/TAi is at least a second predetermined value MB (for example, 2) (Step S13). TAi−1/TAi≧MB is a second ratio condition. If this second ratio condition is satisfied, a reference angle detection flag F is set as the reference angle detection signal since the convex section time TAi−1 corresponds to the convex section 12a indicating the reference angle (Step S14), and the crank stage TCSTG is set to 1 (Step S15). In FIG. 2, the reference angle detection flag F is set to 1 at the time t.

When the first ratio condition, TAi−1/TBi−1≧MA, is satisfied, it is assumed that the TAi−1 corresponding to the elongated convex section 12a is detected. When the second ratio condition, TAi−1/TAi≧MB, is satisfied, it can be judged that the current TAi−1 corresponds to the elongated convex section 12a.

When TAi−1/TBi−1<MA or TAi−1/TAi<MB is established, the CPU 24 takes the current time between falling edges TCi as TBi+TAi, and takes the previous time between falling edges TCi−1 as TBi−1+TAi−1 (Step S17). The current time between rising edges TDi is taken as TBi+TAi−1, and the previous time between rising edges TDi−1 is taken as TBi−1+TAi−2 (Step S18).

Figure 5:
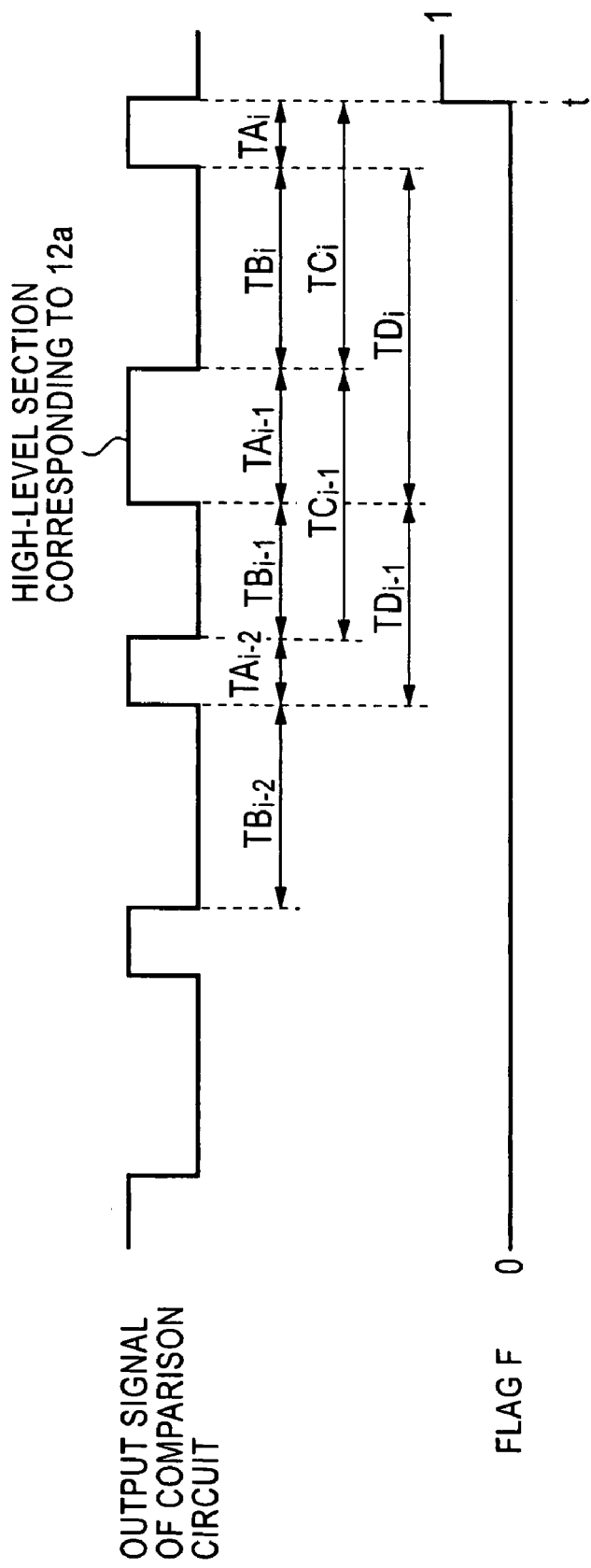
FIG. 5 shows a signal waveform of a comparison circuit and a flag of the crank angle detecting apparatus of FIG. 1.

The CPU 24 also computes the ratio TCi−1/TCi between the previous time between falling edges TCi−1 and the current time between falling edges TCi, and determines whether the ratio TCi−1/TCi is within a predetermined range 1−MC through 1+MC (MC is a fourth predetermined value and 0.102, for example) (Step S19). 1−MC≦TCi−1/TCi≦1+MC is a fourth ratio condition. When the fourth ratio condition is satisfied, the CPU 24 computes the ratio TDi/TDi−1 between the current time between rising edges TDi and the previous time between rising edges TDi−1, and determines whether the ratio TDi/TDi−1 is at least a third predetermined value MD (for example, 2) (Step S20). TDi/TDi−1≧MD is a third ratio condition. When the third ratio condition is satisfied, a flag F is set since the convex section time TAi−1 corresponds to the elongated convex section 12a indicating the reference angle (Step S14). FIG. 5 shows an example in which the flag F is 1 when 1−MC≦TCi−1/TCi≦1+MC and TDi/Tdi−1≧MD are established at the time t.

When the fourth ratio condition 1−MC≦TCi−1/TCi≦1+MC is satisfied, it means that the angular velocity is stable. If the third ratio condition TDi/Tdi−1≧MD is satisfied, it can be judged that the current TDi contains TAi−1 corresponding to the convex section 12a.

On the other hand, if 1−MC>TCi−1/TCi and TCi−1/TCi>1+MC (Step S19), the stable condition of the angular velocity is not satisfied. Thus, the reference angle detection flag F is reset (Step S21). When TDi/TDi−1<MD is established even if the stable condition of the angular velocity is satisfied (Step S20), the process proceeds to Step S21 to reset the reference angle detection flag F, since the convex section time TAi−1 does not correspond to the convex section 12a indicating the reference angle.

In this manner, the CPU 24 detects the reference crank angle position, and sets the crank stages TCSTG for the respective convex sections 12 on the basis of the detected reference angular position. The energization timing for the ignition coil of the ignitor 5, the timing of starting ignition of the ignition plug of the ignitor 5, and the timing of fuel injection performed by the injector 4 are set on the basis of the crank stages TCSTG.

It should be noted that this embodiment performs first determination for the convex section 12a in Steps S12 and S13, and second determination for the convex section 12a in Steps S19 and 20, but either one of the first and second determinations may be omitted.

Although the first determination is executed earlier than the second determination in the illustrated embodiment, the second determination may be executed earlier than the first determination.

It should also be noted that when TAi−1/TBi−1<MA or TAi−1/TAi<MB of the first determination is established, the reference angle detection flag F may be reset immediately.

In the above described embodiment, the ratio TAi−1/TBi−1 between the previous value of the detection section time and the previous value of the detection section distance time, and the ratio TAi−1/TAi between the previous value of the detection section time and the current value of the detection section time are used as at least two ratios decided based on the detection section time and the detection section distance time. However, the present invention is not limited in this regard. For example, the ratio TAi/TBi and the ratio TAi/TAi−1 may be used, or the ratio TAi/TAi−2 and the ratio TAi−1/TAi may be used, or a combination of three ratios may be used.

As the ratio based on the time between the front ends of the detection sections, the ratio TDi/TDi−1 between the current value and the previous value of the time between front ends is used in the above described embodiment. However, the present invention is not limited in this regard.

In the above described embodiment, the angle distance between the rear ends of each two adjacent convex sections 12 on the rotor 11 is the same for all the convex sections 12. Alternatively, the angle distance between the front ends of the convex sections 12 may be made the same. In this case, the ratio TCi/TCi−1 between the current value and the previous value of the time between rear ends of each two adjacent convex sections 12 is used to detect the convex section 12a.

In the above described embodiment, the protrusions 12 are formed as the detection sections along the outer periphery of the rotor 11, but recesses may be formed as the detection sections along the outer periphery of the rotor 11.

Instead of the convex sections 12 formed along the outer periphery of the rotor 11, certain elements may be buried in the outer periphery of the rotor as the detection sections, or suitable marks may be provided on the outer periphery of the rotor as the detection sections.

Although the detection sections 12 are detected by the electromagnetic pickup 13 in the illustrated embodiment, the detection sections 12 may be detected by a suitable optical device.

Although the above described embodiment deals with a case in which the present invention is applied to a four-cycle internal combustion engine of a single cylinder type, the present invention can also be applied to a four-cycle internal combustion engine of a multi-cylinder type or a two-cycle internal combustion engine.

As understood from the foregoing description, the present invention generates the reference angle detection signal, which indicates the detection of the particular detection section 12a, when at least two ratio conditions are met. Therefore, it is possible to detect at high accuracy a fact that the crank angle reaches the reference angle position, even when the number of detection sections on the rotor is large.

This application is based on Japanese Patent Application No. 2005-227834 filed on Aug. 5, 2005 and the entire disclosure thereof is incorporated herein by reference.

What is claimed is:

1. A crank angle detecting apparatus comprising:
    a rotor which rotates in conjunction with a crank shaft of an internal combustion engine, the rotor having an outer periphery and a circumferential direction;
    a plurality of detection sections provided on the outer periphery of the rotor at equiangular intervals in the circumferential direction of the rotor, each said detection section having a front end and a rear end in the circumferential direction of the rotor, one of the plurality of detection sections being used in detection of a reference crank angle and being longer than other said detection sections in the circumferential direction of the rotor;
    a pickup disposed in the vicinity of the outer periphery of the rotor for generating a pulse signal every time the pickup detects the front end of each said detection section and for generating another pulse signal every time the pickup detects the rear end of each said detection section;

a time detection circuit for sequentially detecting, in response to the pulse signals from the pickup, a detection section time, which is a time interval from detection of the front end of one said detection section to detection of the rear end of the same detection section, and a detection section distance time, which is another time interval from detection of the rear end of one said detection section to detection of the front end of a next said detection section; and a reference angle determination circuit for generating a reference angle detection signal which indicates detection of said one of the detection sections, when at least two ratio conditions decided based on the detection section time and the detection section distance time which are detected by the time detection circuit are satisfied.

2. The crank angle detecting apparatus according to claim 1, wherein the reference angle determination circuit includes:

a first ratio determination circuit for computing, as a first ratio condition of the at least two ratio conditions, a first ratio between a previous value of the detection section time and a previous value of the detection section distance time, so as to determine whether the first ratio is at least a first predetermined value; and a second ratio determination circuit for computing, as a second ratio condition of the at least two ratio conditions, a second ratio between the previous value of the detection section time and a current value of the detection section time, so as to determine whether the second ratio is at least a second predetermined value, and wherein the reference angle determination circuit generates the reference angle detection signal when the first ratio is at least the first predetermined value and the second ratio is at least the second predetermined value.

3. The crank angle detecting apparatus according to claim 1, wherein the plurality of detection sections include a plurality of protrusions.

4. The crank angle detecting apparatus according to claim 1, wherein an angular distance between the rear ends of each two adjacent detection sections is the same for all said detection sections, and a length from the front end to the rear end of said one of the detection sections is different from a length from the front end to the rear end of each of the other detection sections.

5. The crank angle detecting apparatus according to claim 1, wherein the plurality of detection sections are made of a magnetic material, and the pickup is a magnetic pickup which magnetically detects the plurality of detection sections.

6. A crank angle detecting apparatus comprising:

a rotor which rotates in conjunction with a crank shaft of an internal combustion engine, the rotor having an outer periphery and a circumferential direction;

a plurality of detection sections provided on the outer periphery of the rotor, each said detection section having a front end and a rear end in the circumferential direction of the rotor, an angular distance between the front ends of each two adjacent detection sections or between the rear ends of each two adjacent detection sections being the same for all the detection sections, one of the detection sections being used in detection of a reference crank angle and being longer than other said detection sections in the circumferential direction of the rotor;

a pickup disposed in the vicinity of the outer periphery of the rotor for generating a pulse signal every time the pickup detects the front end of each said detection section and for generating another pulse signal every time the pickup detects the rear end of each said detection section;

a time detection circuit for sequentially detecting, in response to the pulse signals from the pickup, a first time between the rear ends of said each two adjacent detection sections if the angular distance between the front ends of said each two adjacent detection sections is the same, or a second time between the front ends of said each two adjacent detection sections if the angular distance between the rear ends of said each two adjacent detection sections is the same; and a reference angle determination circuit for generating a reference angle detection signal which indicates detection of said one of the detection sections, when a ratio condition decided based on the first or second time detected by the time detection circuit is satisfied.

7. The crank angle detecting apparatus according to claim 6, wherein the reference angle determination circuit includes a first circuit to compute, as the ratio condition, a first ratio between a current value and a previous value of the first or second time, and generates the reference angle detection signal when the first ratio is at least first predetermined value.

8. The crank angle detecting apparatus according to claim 6, wherein the time detection circuit also detects a third time between the front ends of each two adjacent detection sections when the angular distance between the front ends of the detection sections is the same, or a fourth time between the rear ends of each two adjacent detection sections when the angular distance between the rear ends of the detection sections is the same, in response to the pulse signals from the pickup, the reference angle determination circuit includes a second circuit for computing, as a second ratio, the ratio between a previous value and a current value of the third or fourth time, and determines whether the second ratio is within a predetermined range including a second predetermined value, and the reference angle determination circuit generates the reference angle detection signal when the ratio condition is satisfied and the second ratio is within the predetermined range.

9. The crank angle detecting apparatus according to claim 6, wherein the plurality of detection sections include a plurality of protrusions or a plurality of recesses.

10. The crank angle detecting apparatus according to claim 6, wherein the plurality of detection sections are made of a magnetic material, and the pickup is a magnetic pickup which magnetically detects the plurality of detection sections.

11. A crank angle detecting apparatus comprising:

a rotor which rotates in conjunction with a crank shaft of an internal combustion engine, the rotor having an outer periphery and a circumferential direction;

a plurality of detection sections provided on the outer periphery of the rotor, each said detection section having a front end and a rear end in the circumferential direction of the rotor, an angular distance between the front ends of each two adjacent detection sections being the same for all the detection sections or an angular distance between the rear ends of each two adjacent detection sections being the same for all the detection sections, and one of the detection sections being used in detection of a reference crank angle and being longer than other said detection sections in the circumferential direction of the rotor;

a pickup disposed in the vicinity of the outer periphery of the rotor for generating a pulse signal every time the pickup detects the front end of each said detection section and for generating another pulse signal every time the pickup detects the rear end of each said detection section;

a first time detection circuit for sequentially detecting, in response to the pulse signals from the pickup, a detection section time between detection of the front end of the detection section and detection of the rear end of the same detection section, and a detection section distance time between detection of the rear end of one said detection section and detection of the front end of a next said detection section;

a second time detection circuit for sequentially detecting, in response to the pulse signals from the pickup, a first time between the rear ends of each said two adjacent detection sections if the angular distance between the front ends of each said two adjacent detection sections is the same, or a second time between the front ends of each said two adjacent detection sections if the angular distance between the rear ends of each said two adjacent detection sections is the same; and a reference angle determination circuit for generating a reference angle detection signal which indicates detection of said one of the detection sections, when at least two ratio conditions decided based on the detection section time and the detection section distance time which are detected by the first time detection circuit are satisfied, or when another ratio condition decided based on the first or second time which is detected by the second time detection circuit is satisfied.

12. The crank angle detecting apparatus according to claim 11, wherein the plurality of detection sections include a plurality of protrusions or a plurality of recesses.

13. The crank angle detecting apparatus according to claim 11, wherein the plurality of detection sections are made of a magnetic material, and the pickup is a magnetic pickup which magnetically detects the plurality of detection sections.

14. A reference angular position detection method for a crank shaft of an internal combustion engine, for use with a crank angle detecting apparatus, the crank angle detecting apparatus including:

a rotor which rotates in conjunction with the crank shaft of the internal combustion engine;

a plurality of detection sections provided at equiangular intervals on an outer periphery of the rotor, one of the plurality of detection sections being used in detection of a reference crank angle and being longer than other said detection sections in a circumferential direction of the rotor; and a pickup disposed in the vicinity of the outer periphery of the rotor for generating a pulse signal every time the pickup detects a front end of each said detection section and for generating another pulse signal every time the pickup detects a rear end of each said detection section, the reference angular position detection method comprising:

sequentially detecting, in response to the pulse signals from the pickup, a detection section time, which is a time interval between detection of the front end of one said detection section and detection of the rear end of the same detection section, and a detection section distance time, which is a time interval between detection of the rear end of one said detection section and detection of the front end of a next said detection section; and generating a reference angle detection signal which indicates detection of said one of the detection sections, when at least two ratio conditions decided based on the detection section time and the detection section distance time are satisfied.

15. A reference angular position detection method for a crank shaft of an internal combustion engine, for use with a crank angle detecting apparatus, the crank angle detecting apparatus including:

a rotor which rotates in conjunction with the crank shaft of an internal combustion engine;

a plurality of detection sections provided on an outer periphery of the rotor, an angular distance between front ends of each two adjacent detection sections or between rear ends of each two adjacent detection sections being the same for all the detection sections, one of the detection sections being used in detection of a reference crank angle and being longer than other detection sections in a circumferential direction of the rotor; and a pickup disposed in the vicinity of the outer periphery of the rotor for generating a pulse signal every time the pickup detects the front end of each said detection section and for generating another pulse signal every time the pickup detects the rear end of each said detection section, the reference angular position detection method comprising:

sequentially detecting, in response to the pulse signals from the pickup, a first time between the rear ends of each said two adjacent detection sections if the angular distance between the front ends of said each adjacent detection sections is the same, or a second time between the front ends of each said two adjacent detection sections if the angular distance between the rear ends of said each adjacent detection sections is the same; and generating a reference angle detection signal which indicates detection of said one of the detection sections, when a ratio condition decided based on the first or second time is satisfied.

16. A reference angular position detection method for a crank shaft of an internal combustion engine, for use with a crank angle detecting apparatus, the crank angle detecting apparatus including:

a rotor which rotates in conjunction with the crank shaft of the internal combustion engine;

a plurality of detection sections provided on an outer periphery of the rotor, an angular distance between front ends of each two adjacent detection sections or between rear ends of each two adjacent detection sections being the same for all the detection sections, one of the detection sections being used in detection of a reference crank angle and being longer than other said detection sections in a circumferential direction of the rotor; and a pickup disposed in the vicinity of the outer periphery of the rotor for generating a pulse signal every time the pickup detects the front end of each said detection section and for generating another pulse signal every time the pickup detects the rear end of each said detection section, the reference angular position detection method comprising:

sequentially detecting, in response to the pulse signals from the pickup, a detection section time between detection of the front end of one said detection section and detection of the rear end of the same detection section, and a detection section distance time between detection of the rear end of one said detection section and detection of the front end of a next said detection section;

sequentially detecting, in response to the pulse signals from the pickup, a first time between the rear ends of each said two adjacent detection sections if the angular distance between the front ends of said each adjacent detection sections is the same, or a second time between the front ends of each said two adjacent detection sections if the angular distance between the rear ends of each said adjacent detection sections is the same; and generating a reference angle detection signal which indicates detection of said one of the detection sections when at least two ratio conditions decided based on the detection section time and the detection section distance time are satisfied, or when another ratio condition decided based on the first or second time is satisfied.

* * * * *